United States Patent
Tanaka et al.

(10) Patent No.: US 12,536,456 B2
(45) Date of Patent: Jan. 27, 2026

(54) AGGREGATED DATA RESOLUTION ENHANCEMENT DEVICE, AGGREGATED DATA RESOLUTION ENHANCEMENT METHOD, AND AGGREGATED DATA RESOLUTION ENHANCEMENT PROGRAM

(71) Applicant: NTT, Inc., Tokyo (JP)

(72) Inventors: Yusuke Tanaka, Tokyo (JP); Tomoharu Iwata, Tokyo (JP); Takeshi Kurashima, Tokyo (JP); Hiroyuki Toda, Tokyo (JP); Toshiyuki Tanaka, Kyoto (JP)

(73) Assignee: NTT, Inc., Tokyo (JP)

( * ) Notice: Subject to any disclaimer, the term of this patent is extended or adjusted under 35 U.S.C. 154(b) by 966 days.

(21) Appl. No.: 17/626,027

(22) PCT Filed: Jul. 10, 2020

(86) PCT No.: PCT/JP2020/027112
§ 371 (c)(1),
(2) Date: Jan. 10, 2022

(87) PCT Pub. No.: WO2021/006347
PCT Pub. Date: Jan. 14, 2021

(65) Prior Publication Data
US 2022/0253736 A1    Aug. 11, 2022

(30) Foreign Application Priority Data

Jul. 10, 2019   (JP) ................................ 2019-128429

(51) Int. Cl.
*G06N 7/08* (2006.01)

(52) U.S. Cl.
CPC ...................................... *G06N 7/08* (2013.01)

(58) Field of Classification Search
None
See application file for complete search history.

(56) References Cited

PUBLICATIONS

Tanaka, Yusuke, et al. "Refining Coarse-grained Spatial Data using Auxiliary Spatial Data Sets with Various Granularities." arXiv preprint arXiv:1809.07952 (2018). (Year: 2018).*

(Continued)

*Primary Examiner* — Eric Nilsson

(57) ABSTRACT

A parameter estimation section 106 is configured to perform estimation, for aggregate data in which values are associated with respective regions obtained by subdividing a space and for a Gaussian process model that expresses a plurality of aggregate data of differing partition granularity. The estimation is performed based on the Gaussian process model including a spatial scale parameter of a correlation function between regions of the aggregate data and including a noise variance parameter of the correlation function, by estimating the spatial scale parameter and the noise variance parameter so as to maximize a function expressing values of the aggregate data by area integrals of a Gaussian process. A high resolution data computation section 111 is configured to perform computation in the Gaussian process model including the estimated spatial scale parameter and noise variance parameter by computing high resolution data in which the resolution of the subject aggregate data is enhanced by taking area integrals of the values of the aggregate data subject to enhancement, by computation for each region obtained by subdividing the space at the granularity indicated by the target partition.

4 Claims, 6 Drawing Sheets

(56) References Cited

PUBLICATIONS

Tanaka et al. (2019) "Refining coarse-grained spatial data using auxiliary spatial data sets with various granularities" AAAI'19.
Teh et al. (2005) "Semiparametric latent factor models" AISTATS'05, pp. 333-340.
Boyle et al. (2005) "Dependent Gaussian processes" NeurIPS, pp. 217-224.
Titsias et al. (2009) "Variational learning of inducing variables in sparse Gaussian processes" AISTATS, pp. 567-574.
Liu et al. (1989) "On the limited memory BFGS method for large scale optimization" Mathematical Programming, vol. 45 (1-3): 503-528.
Tanaka et al. (2020) "Spatially Aggregated Gaussian Processes with Multivariate Areal Outputs" arXiv:1907.08350v2. [online], Jan. 7, 2020.

* cited by examiner

AGGREGATED DATA RESOLUTION ENHANCEMENT DEVICE, AGGREGATED DATA RESOLUTION ENHANCEMENT METHOD, AND AGGREGATED DATA RESOLUTION ENHANCEMENT PROGRAM

CROSS-REFERENCE TO RELATED APPLICATIONS

This application is a U.S. National Stage Application filed under 35 U.S.C. § 371 claiming priority to International Patent Application No. PCT/JP2020/027112, filed on 10 Jul. 2020, which application claims priority to and the benefit of JP Application No. 2019-128429, filed on 10 Jul. 2019, the disclosures of which are hereby incorporated herein by reference in their entireties.

TECHNICAL FIELD

Technology disclosed herein relates to an aggregate data resolution enhancement device, an aggregate data resolution enhancement method, and an aggregate data resolution enhancement program.

BACKGROUND ART

In recent years, organizations such as governments and businesses have been collecting and releasing various types of spatial data (for example data relating to poverty levels, air pollution levels, crime rates, population, traffic volumes, and the like) for the purpose of improving the urban environment or businesses. Spatial data refers to data in which position information (latitude and longitude, addresses, districts or the like) and associated values are paired.

Due to the high costs of collecting such spatial data and the difficulty of collecting data with adequate sample sizes, spatial data is often aggregated and provided for spatial partitions taken by subdividing a space into large units, namely for spatial partitions (addresses, districts or the like) with somewhat coarse granularity. Such data will be referred to hereafter as "aggregate data".

However, in order to achieve more effective improvements to the urban environment, aggregate data at as high a resolution as possible is desired. For example, more appropriate intervention becomes possible when regions of high poverty levels or regions of high air pollution levels are focused on in more detail. There is accordingly an important issue regarding converting coarse granularity aggregate data into high resolution data.

In conventional technology based on a Gaussian process, other types of aggregate data at various resolutions are also prepared separately to the low resolution aggregate data being targeted, and high resolution aggregate data being targeted is predicted by using these types of aggregate data as auxiliary data to train a regression model (Non-Patent Document 1).

Moreover, although not technology applied to aggregate data, plural types of data are simultaneously modeled based on a multivariate Gaussian process to implement high precision predictions regarding data with a small sample size (Non-Patent Document 2).

PRIOR ART LITERATURE

Non-Patent Documents

Non-Patent Document 1: "Refining Coarse-grained Spatial Data using Auxiliary Spatial Data Sets with Various Granularities" by Y. Tanaka, T. Iwata, T. Tanaka, T. Kurashima, M. Okawa, and H. Toda, in AAAI 2019

Non-Patent Document 2: "Semiparametric Latent Factor Models" by Y. W. Teh, M. Seeger, and M. I. Jordan, in AISTATS 2005, pages 333-340

SUMMARY OF INVENTION

Technical Problem

However, in the method described in Non-Patent Document 1 there is an issue (1) of incorrect evaluation of spatial correlation in cases in which a region has a peculiar shape (for example a region with a narrow elongated shape). There is also another issue (2) of there being a tendency to determine auxiliary data at a low resolution to be data of low reliability, and accordingly ignored in training processes, even if such data would be useful in predicting the high resolution data being targeted.

Moreover, the method described in Non-Patent Document 2 also has an issue of presupposing data to be associated with points (such as latitude and longitude), and so is not able to handle aggregate data.

In consideration of the above circumstances, an object of the present disclosure is to provide an aggregate data resolution enhancement device, an aggregate data resolution enhancement method, and an aggregate data resolution enhancement program that enable the resolution of aggregate data to be enhanced with good precision.

Solution to Problem

A first aspect of the present disclosure is an aggregate data resolution enhancement device including a parameter estimation section, a reception section, and a high resolution data computation section. The parameter estimation section is configured to perform estimation for aggregate data in which values are associated with respective regions obtained by subdividing a space and for a Gaussian process model that expresses plural aggregate data in which a granularity of partition differs with other aggregate data, with the estimation being performed based on the Gaussian process model also including a spatial scale parameter of a correlation function between the aggregate data and including a noise variance parameter of the correlation function, by estimating the spatial scale parameter and the noise variance parameter so as to maximize a function expressing values of the aggregate data by area integrals of a Gaussian process. The reception section is configured to receive aggregate data subject to resolution enhancement and a designation of a target partition indicating to subdivide space at a higher resolution granularity than that of the subject aggregate data. The high resolution data computation section is configured to perform computation in the Gaussian process model including the spatial scale parameter and the noise variance parameter estimated by the parameter estimation section by computing high resolution data in which the resolution of the subject aggregate data is enhanced by taking area integrals of the values of the subject aggregate data, by computation for each region obtained by subdividing the space at the granularity indicated by the target partition.

A second aspect of the present disclosure is an aggregate data resolution enhancement device including a parameter estimation section and a high resolution data computation section. The parameter estimation section is configured to perform optimization, for aggregate data in which values are associated with respective spatial partitions obtained by subdividing a D-dimensional space and for a Gaussian process model that expresses plural aggregate data in which at least one of a type of value, the D-dimensional space, or a granularity of partition differs with other aggregate data, with the Gaussian process model also including a scale parameter of a correlation function between partial regions of the aggregate data and a noise variance parameter of the correlation function, by employing an objective function expressing values of the aggregate data by area integrals of a Gaussian process to optimize the scale parameter and the noise variance parameter. The high resolution data computation section is input with a selection of aggregate data subject to resolution enhancement from among the plural aggregate data and is input with a designation of a target partition indicating to subdivide the D-dimensional space at a higher resolution granularity than that of the subject aggregate data. The high resolution data computation section is configured to compute high resolution data in which the resolution of the subject aggregate data is enhanced by taking area integrals in the Gaussian process model optimized by the parameter estimation section, by computing for each spatial partition obtained by subdividing the D-dimensional space at the granularity indicated by the target partition.

A third aspect of the present disclosure is an aggregate data resolution enhancement device including a parameter estimation section that, for aggregate data of values associated with respective spatial partitions obtained by subdividing a D-dimensional space, is input with aggregate data subject to resolution enhancement and is input with a designation of a target partition indicating to subdivide the D-dimensional space at a higher resolution granularity than that of the subject aggregate data, and that is configured, for a Gaussian process model that includes the aggregate data subject to the resolution enhancement and expresses plural aggregate data in which at least one of a type of value, the D-dimensional space, or a granularity of partition differs with other aggregate data, with the Gaussian process model also including a scale parameter of a correlation function between partial regions of the aggregate data and a noise variance parameter of the correlation function, to optimize the scale parameter and the noise variance parameter by employing an objective function expressing values of the aggregate data by area integrals of a Gaussian process, and a high resolution data computation section that is configured to compute high resolution data in which the resolution of the subject aggregate data is enhanced by taking area integrals in the Gaussian process model optimized by the parameter estimation section, by computation for each spatial partition obtained by subdividing the D-dimensional space at the granularity indicated by the target partition.

A fourth aspect of the present disclosure is an aggregate data resolution enhancement device including a reception section configured to, for aggregate data of values associated with respective spatial partitions obtained by subdividing a D-dimensional space, receive a selection of aggregate data subject to resolution enhancement from among plural aggregate data in which at least one of a type of value, the D-dimensional space, or partition granularity differs with other aggregate data, and receive a designation of a target partition indicating to subdivide a space at a higher resolution granularity than that of the subject aggregate data, and an output section configured to employ the plural aggregate data to output high resolution data in which the resolution of the subject aggregate data is enhanced, and to output a visualization of the plural aggregate data and of a correlation between the plural aggregate data obtained through processing to enhance the resolution of the subject aggregate data.

A fifth aspect of the present disclosure is an aggregate data resolution enhancement device including a reception section configured to, for aggregate data of values associated with respective spatial partitions obtained by subdividing a D-dimensional space, receive aggregate data subject to resolution enhancement and receive a designation of a target partition indicating to subdivide a space at a higher resolution granularity than that of the subject aggregate data, and an output section configured to employ plural aggregate data including the subject aggregate data and in which at least one of a type of value, the D-dimensional space, or partition granularity differs with other aggregate data in order to output high resolution data in which the resolution of the subject aggregate data is enhanced and to output a visualization of the plural aggregate data and of a correlation between the plural aggregate data obtained through processing to enhance the resolution of the subject aggregate data.

A sixth aspect of the present disclosure is an aggregate data resolution enhancement method including performing estimation with a parameter estimation section, for aggregate data in which values are associated with respective regions obtained by subdividing a space and for a Gaussian process model that expresses plural aggregate data in which a granularity of partition differs with other aggregate data, by performing estimation based on the Gaussian process model including a spatial scale parameter of a correlation function between the aggregate data and including a noise variance parameter of the correlation function, by estimating the spatial scale parameter and the noise variance parameter so as to maximize a function expressing values of the aggregate data by area integrals of a Gaussian process, receiving with a reception section aggregate data subject to resolution enhancement and a designation of a target partition indicating to subdivide space at a higher resolution granularity than that of the subject aggregate data, and performing computation with a high resolution data computation section in the Gaussian process model including the spatial scale parameter and the noise variance parameter estimated by the parameter estimation section by computing high resolution data in which the resolution of the subject aggregate data is enhanced by taking area integrals of the values of the subject aggregate data, by computation for each region obtained by subdividing the space at the granularity indicated by the target partition.

A seventh aspect of the present disclosure is an aggregate data resolution enhancement method including performing optimization with a parameter estimation section, for aggregate data in which values are associated with respective spatial partitions obtained by subdividing a D-dimensional space and for a Gaussian process model that expresses plural aggregate data in which a granularity of partition differs with other aggregate data, with the Gaussian process model also including a scale parameter of a correlation function between partial regions of the aggregate data and a noise variance parameter of the correlation function, by employing an objective function expressing values of the aggregate data by area integrals of a Gaussian process to optimize the scale parameter and the noise variance parameter, and with a high resolution data computation section, receiving input of a selection of aggregate data subject to resolution enhancement from among the plural aggregate data and receiving input of a designation of a target partition indicating to subdivide the D-dimensional space at a higher resolution granularity than that of the subject aggregate data, and computing high resolution data in which the resolution of the subject aggregate data is enhanced by taking area integrals in the Gaussian process model optimized by the parameter estimation section, by computation for each spatial partition obtained by subdividing the D-dimensional space at the granularity indicated by the target partition.

An eighth aspect of the present disclosure is an aggregate data resolution enhancement method including performing optimization with a parameter estimation section, for aggregate data of values associated with respective spatial partitions obtained by subdividing a D-dimensional space, receiving input of aggregate data subject to resolution enhancement and input of a designation of a target partition indicating to subdivide the D-dimensional space at a higher resolution granularity than that of the subject aggregate data, and for a Gaussian process model that includes the aggregate data subject to the resolution enhancement and that expresses plural aggregate data in which at least one of a type of value, the D-dimensional space, or a granularity of partition differs with other aggregate data, with the Gaussian process model also including a scale parameter of a correlation function between partial regions of the aggregate data and a noise variance parameter of the correlation function, by optimizing the scale parameter and the noise variance parameter by employing an objective function expressing values of the aggregate data by area integrals of a Gaussian process, and with a high resolution data computation section, computing high resolution data in which the resolution of the subject aggregate data is enhanced by taking area integrals in the Gaussian process model optimized by the parameter estimation section, by computation for each spatial partition obtained by subdividing the D-dimensional space at the granularity indicated by the target partition.

A ninth aspect of the present disclosure is an aggregate data resolution enhancement method including with a reception section, for aggregate data of values associated with respective spatial partitions obtained by subdividing a D-dimensional space, receiving a selection of aggregate data subject to resolution enhancement from among plural aggregate data in which at least one of a type of value, the D-dimensional space, or partition granularity differs with other aggregate data and receiving a designation of a target partition indicating to subdivide a space at a higher resolution granularity than that of the subject aggregate data, and with an output section, employing the plural aggregate data to output high resolution data in which the resolution of the subject aggregate data is enhanced, and to output a visualization of the plural aggregate data and of a correlation between the plural aggregate data obtained through processing to enhance the resolution of the subject aggregate data.

A tenth aspect of the present disclosure is an aggregate data resolution enhancement method including with a reception section, for aggregate data of values associated with respective spatial partitions obtained by subdividing a D-dimensional space, receiving aggregate data subject to resolution enhancement and receiving a designation of a target partition indicating to subdivide a space at a higher resolution granularity than that of the subject aggregate data, and with an output section, employing plural aggregate data including the subject aggregate data and in which at least one of a type of value, the D-dimensional space, or partition granularity differs with other aggregate data in order to output high resolution data in which the resolution of the subject aggregate data is enhanced and to output a visualization of the plural aggregate data and of a correlation between the plural aggregate data obtained through processing to enhance the resolution of the subject aggregate data.

An eleventh aspect of the present disclosure is an aggregate data resolution enhancement program for causing a computer to perform estimation, for aggregate data in which values are associated with respective regions obtained by subdividing a space and for a Gaussian process model that expresses plural aggregate data in which at least one of a type of value, the space, or a granularity of partition differs with other aggregate data, and based on the Gaussian process model including a spatial scale parameter of a correlation function between regions of the aggregate data and including a noise variance parameter of the correlation function, by estimating the spatial scale parameter and the noise variance parameter so as to maximize a function expressing values of the aggregate data by area integrals of a Gaussian process, receive aggregate data subject to resolution enhancement and a designation of a target partition indicating to subdivide space at a higher resolution granularity than that of the subject aggregate data, and to perform computation in the Gaussian process model including the estimated spatial scale parameter and the estimated noise variance parameter by computing high resolution data in which the resolution of the subject aggregate data is enhanced by taking area integrals of the values of the subject aggregate data, by computation for each region obtained by subdividing the space at the granularity indicated by the target partition.

A twelfth aspect of the present disclosure is an aggregate data resolution enhancement program for causing a computer to perform optimization, for aggregate data in which values are associated with respective spatial partitions obtained by subdividing a D-dimensional space and for a Gaussian process model that expresses plural aggregate data in which a granularity of partition differs with other aggregate data, the Gaussian process model also including a scale parameter of a correlation function between partial regions of the aggregate data and a noise variance parameter of the correlation function, by employing an objective function expressing values of the aggregate data by area integrals of a Gaussian process to optimize the scale parameter and the noise variance parameter, receive input of a selection of aggregate data subject to resolution enhancement from among the plural aggregate data and receive input of a designation of a target partition indicating to subdivide the D-dimensional space at a higher resolution granularity than that of the subject aggregate data, and compute high resolution data in which the resolution of the subject aggregate data is enhanced by taking area integrals in the optimized Gaussian process model for each spatial partition obtained by subdividing the D-dimensional space at the granularity indicated by the target partition.

A thirteenth aspect of the present disclosure is an aggregate data resolution enhancement program for causing a computer to perform optimization, for aggregate data of values associated with respective spatial partitions obtained by subdividing a D-dimensional space, receive input of aggregate data subject to resolution enhancement and receive input of a designation of a target partition indicating to subdivide the D-dimensional space at a higher resolution granularity than that of the subject aggregate data and for a Gaussian process model that includes the aggregate data subject to the resolution enhancement and that expresses plural aggregate data in which at least one of a type of value, the D-dimensional space, or a granularity of partition differs with other aggregate data, the Gaussian process model also including a scale parameter of a correlation function between partial regions of the aggregate data and a noise variance parameter of the correlation function, by optimizing the scale parameter and the noise variance parameter by employing an objective function expressing values of the aggregate data by area integrals of a Gaussian process, and to compute high resolution data in which the resolution of the subject aggregate data is enhanced by taking area integrals in the optimized Gaussian process model for each spatial partition obtained by subdividing the D-dimensional space at the granularity indicated by the target partition.

A fourteenth aspect of the present disclosure is an aggregate data resolution enhancement program for causing a computer to, for aggregate data of values associated with respective spatial partitions obtained by subdividing a D-dimensional space, receive a selection of aggregate data subject to resolution enhancement from among plural aggregate data in which at least one of a type of value, the D-dimensional space, or partition granularity differs with other aggregate data and receive a designation of a target partition indicating to subdivide a space at a higher resolution granularity than that of the subject aggregate data, and employ the plural aggregate data to output high resolution data in which the resolution of the subject aggregate data is enhanced, and to output a visualization of the plural aggregate data and of a correlation between the plural aggregate data obtained through processing to enhance the resolution of the subject aggregate data.

A fifteenth aspect of the present disclosure is an aggregate data resolution enhancement program for causing a computer to, for aggregate data of values associated with respective spatial partitions obtained by subdividing a D-dimensional space, receive aggregate data subject to resolution enhancement and receive a designation of a target partition indicating to subdivide a space at a higher resolution granularity than that of the subject aggregate data, and employ plural aggregate data including the subject aggregate data and in which at least one of a type of value, the D-dimensional space, or partition granularity differs with other aggregate data in order to output high resolution data in which the resolution of the subject aggregate data is enhanced and to output a visualization of the plural aggregate data and of a correlation between the plural aggregate data obtained through processing to enhance the resolution of the subject aggregate data.

Advantageous Effects

The technology of the present disclosure enables the resolution of the aggregate data to be enhanced with an even higher level of precision.

DESCRIPTION OF EMBODIMENTS

Figure 1:
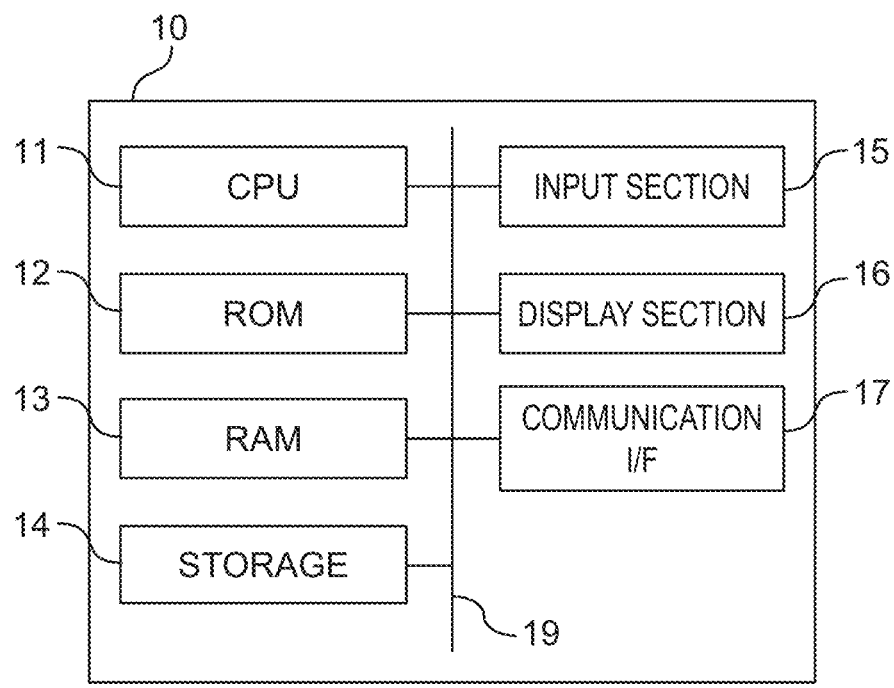
FIG. 1 is a block diagram illustrating a schematic configuration of a computer that functions as an aggregate data resolution enhancement device according to an exemplary embodiment.

Outline of Aggregate Data Resolution Enhancement Device According to Exemplary Embodiment of Technology Disclosed Herein.

First, explanation follows regarding an outline of an aggregate data resolution enhancement device according to an exemplary embodiment.

Recently various types of data (for example data relating to poverty levels, air pollution levels, crime rates, population, traffic volumes, and the like) are being collected using developments in sensor and database technology.

Due to the high collection costs of such data and the difficulty of collecting data with adequate sample sizes, often a D-dimensional space (D being a natural number of 1 or higher) is subdivided, and samples are aggregated and provided for the spatial partitions obtained thereby. Such data will be referred to hereafter as "aggregate data". Namely, aggregate data is data having values associated with each spatial partition obtained by subdividing the D-dimensional space. The D-dimensional space is also referred to as input variables (such as time and space), and the values are also referred to as output variables (such as poverty level). The input variables are not limited to time and space. For example, age (for example 10 to 19, 20 to 29) may be applied as an input variable.

The spatial partitions described above may have any freely selected number of dimensions. For example, chronological data obtained by a sensor is expressed in one-dimensional space, and the subdivided ranges correspond to time intervals such as "one minute". Crime rate data acquired for a city is expressed in two-dimensional space and the subdivided ranges correspond to regions such as addresses or districts.

However, an issue arises in cases in which the range for aggregation is too large in that the possibility to exploit the data decreases. For example, in order to achieve more effective improvements in the urban environment, aggregate data at as high a resolution as possible is desired. More appropriate intervention becomes possible when regions of high poverty levels or regions of high air pollution levels are focused on in more detail. There is accordingly an important issue regarding converting coarse granularity aggregate data into high resolution data.

The method of Non-Patent Document 1 is based on a Gaussian process and predicts high resolution data being targeted by training a regression model using plural types of aggregate data as auxiliary data. However, the three following issues arise with the method of Non-Patent Document 1.

1. Incorrect Spatial Correlation Evaluation Caused by Using Region Centroid

In the method of Non-Patent Document 1, data values associated with a region are handled as aggregate data associated with the centroid of the corresponding region. Applying this method has the advantage of facilitating formulation based on a Gaussian process. However, there is an issue that arises due to this simplification in that spatial correlation between the centroids of regions is substituted for spatial correlation between regions, and spatial correlation is evaluated incorrectly in cases in which a region has a peculiar shape (for example a narrow elongated region).

2. Low Resolution Auxiliary Data not Fully Exploited

In the method of Non-Patent Document 1 aggregate data of various resolutions can be employed as auxiliary data. An estimation procedure includes (1) performing spatial interpolation on auxiliary data using Gaussian process regression to align with the targeted resolution, and (2) training a regression model of the target data. A key point of Non-Patent Document 1 is that the regression model is trained in consideration of the reliability of predicted values found when spatial interpolation is performed. When this is being performed, there is a tendency to determine low resolution auxiliary data to be low reliability data, resulting in an issue of such data being ignored during the training process even though this data would be useful in predicting the high resolution data being targeted.

3. Exploitable Auxiliary Data Limited to Same Region

In the method of Non-Patent Document 1, the auxiliary data is assumed to be limited to that of the same region. For example, in a case in which the target data is poverty levels in New York City, other data relating to the same New York City (for example air pollution levels or crime rates) may be exploited as auxiliary data. However, depending on the city, it is conceivable that there are not many types of usable auxiliary data available. An issue in conventional technology is that it is difficult to predicted high resolution data with a high level of precision in cases in which there is little usable auxiliary data.

In the method of Non-Patent Document 2, plural types of data are simultaneously modeled based on a multivariate Gaussian process to enable high precision predictions regarding data with a small sample size.

However, the method of Non-Patent Document 2 envisages data to be associated with points (such as latitude and longitude), resulting in the issue that this method is not able to handle aggregate data in the manner addressed by the present disclosure. Although a simplistic application thereto is possible by assuming data values to be associated with the centroid of each region, similarly to in Non-Patent Document 1, the issue (1) described above remains unresolved.

Accordingly, an aggregate data resolution enhancement device of the present disclosure effectively exploits a wide variety of aggregate data for plural regions to implement high resolution data prediction with a high level of precision by (1) simultaneously modeling plural aggregate data based on a multivariate Gaussian process, and (2) expressing values of the aggregate data by area integrals of a Gaussian process. Technique 1 and technique 2 below are disclosed in this regard.

Technique 1: Gaussian Process Modeling and Parameter Estimation Considering Spatial Correlation Between Regions Values of aggregate data are expressed by area integrals of a Gaussian process based on a Gaussian process model with unknown variables of a "spatial scale parameter" and a "noise variance parameter" so as to estimate the unknown variables of the Gaussian process model from the aggregate data using maximum likelihood estimation.

An advantageous effect of Technique 1 is that values of aggregate data are expressed by area integrals of a Gaussian process such that the spatial correlation between two regions is expressed by summing the values of a correlation function computed for a combination of numerous points contained in each region. This enables accurate evaluation of the spatial correlation between regions of various sizes and shapes so as to be able to accurately estimate the unknown variables of a Gaussian process model. This enables the resolution of the aggregate data to be enhanced with good precision.

Technique 2: Multivariate Gaussian Process Modeling and Parameter Estimation Considering Spatial Correlation Between Regions Values of aggregate data are expressed by area integrals of a Gaussian process based on a multivariate Gaussian process model expressed by a linear mix of plural latent Gaussian processes, with unknown variables of a "spatial scale parameter", "mixing coefficients", a "residual variance parameter", and a "noise variance parameter", so as to estimate the unknown variables of the Gaussian process model from the aggregate data using the maximum likelihood estimation.

In addition to the advantageous effect of Technique 1, Technique 2 also enables training to be performed with a "spatial scale parameter" common to plural aggregate data by simultaneously modeling the plural aggregate data based on a multivariate Gaussian process model expressed by a linear mix of plural latent Gaussian processes. This enables prediction of high resolution data effectively exploiting low resolution aggregate data even in cases in which such low resolution aggregate data is present.

In consideration of a situation in which aggregate data is available for plural cities, plural aggregate data are simultaneously modeled based on a multivariate Gaussian process model expressed by a linear mix of plural latent Gaussian processes so as to enable training to be performed using a "spatial scale parameter" and "mixing coefficients" common to the plural cities and across the plural aggregate data sets. This enables aggregate data for other cities to be effectively exploited to predict high resolution data even in cases in which there are few types of aggregate data available for a given city. This enables the resolution of aggregate data to be enhanced with an even better level of precision than that achieved by Technique 1.

Configuration of Aggregate Data Resolution Enhancement Device According to Exemplary Embodiment of Technology Disclosed Herein An aggregate data resolution enhancement device 10 according to the present disclosure addresses aggregate data aggregated at any freely selected spatial granularity (for simplicity referred to hereafter as "aggregate data") in general, and may be flexibly applied irrespective of the type of aggregate data employed (for example poverty levels, air pollution levels, traffic volumes, or the like). Explanation follows regarding an exemplary embodiment for a case of enhancing the resolution of the aggregate data under conditions of plural types of general aggregate data being given for a single city, values of aggregate data being expressed by area integrals of a Gaussian process based on a multivariate Gaussian process model, and of estimating unknown variables of the Gaussian process model from the aggregate data using a maximum likelihood estimation.

Explanation follows regarding an example of an exemplary embodiment of technology disclosed herein, with reference to the drawings. Note that the same or equivalent configuration elements and portions are allocated the same reference numerals in each of the drawings. Moreover, proportional dimensions in the drawings may be exaggerated in order to aid explanation, and may therefore differ from the actual proportions.

FIG. 1 is a block diagram illustrating a hardware configuration of an aggregate data resolution enhancement device 10 according to the present exemplary embodiment. As illustrated in FIG. 1, the aggregate data resolution enhancement device 10 includes a central processing unit (CPU) 11, read only memory (ROM) 12, random access memory (RAM) 13, storage 14, an input section 15, a display section 16, and a communication interface (I/F) 17. The respective configurations are connected together through a bus 19 so as to be capable of communicating with each other.

The CPU 11 is a central processing unit that executes various programs and controls various sections. Namely, the CPU 11 reads a program from the ROM 12 or the storage 14, and executes the program using the RAM 13 as a workspace. The CPU 11 controls the various configurations mentioned above and performs various arithmetic processing according to programs stored in the ROM 12 or the storage 14. In the present exemplary embodiment, the ROM 12 or the storage 14 is stored with an aggregate data resolution enhancement device program used to execute aggregate data resolution enhancement processing.

The ROM 12 is stored with various programs and various data. The RAM 13 serves as a workspace and temporarily stores programs or other data. The storage 14 is configured by a hard disk drive (HDD) or a solid state drive (SSD), and is stored with various programs including an operating system, as well as various other data.

The input section 15 includes a pointing device such as a mouse, as well as a keyboard, and is used to perform various input.

The display section 16 is, for example, a liquid crystal display that displays various information. The display section 16 may employ a touch panel to further function as the input section 15.

The communication interface 17 is an interface for communicating with other equipment, such as an external device (not illustrated in the drawings), and may employ a standard such as Ethernet (registered trademark), FDDI, Wi-Fi (registered trademark) or the like.

Next, explanation follows regarding functional configuration of the aggregate data resolution enhancement device 10.

Figure 2:
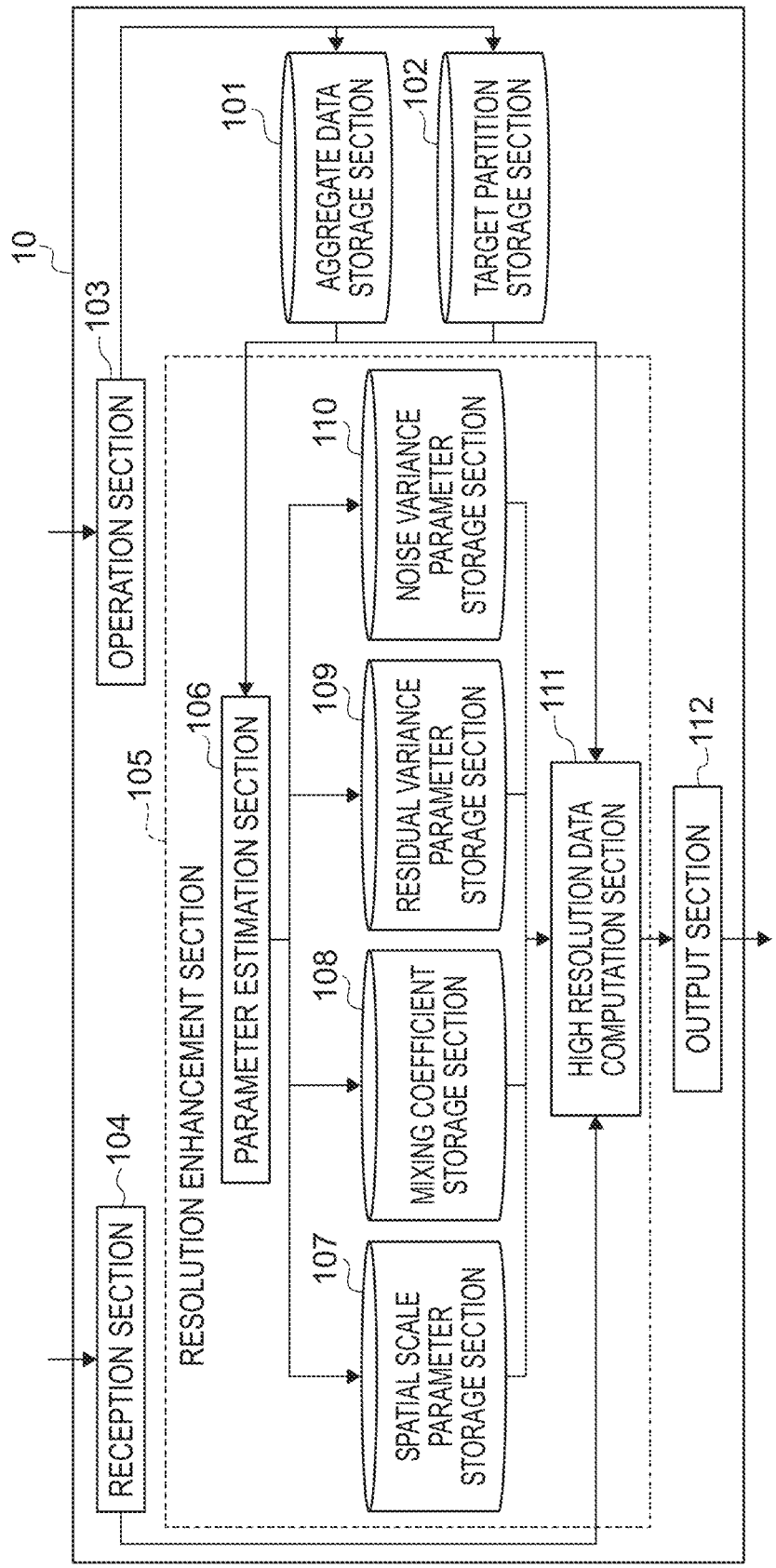
FIG. 2 is a block diagram illustrating an example of a functional configuration of an aggregate data resolution enhancement device according to an exemplary embodiment.

FIG. 2 is a block diagram illustrating an example of functional configuration of the aggregate data resolution enhancement device 10. As illustrated in FIG. 2, the aggregate data resolution enhancement device 10 includes functional configuration of an aggregate data storage section 101, a target partition storage section 102, an operation section 103, a reception section 104, a resolution enhancement section 105, and an output section 112. Each functional configuration is implemented by the CPU 11 reading the aggregate data resolution enhancement program stored in the ROM 12 or the storage 14 and expanding and executing the aggregate data resolution enhancement program in the RAM 13.

The aggregate data storage section 101 is stored with aggregate data being targeted for analysis. The aggregate data storage section 101 reads the aggregate data according to a request from the resolution enhancement section 105 and passes this aggregate data to the resolution enhancement section 105. Explanation follows regarding the aggregate data stored in the aggregate data storage section 101. A set expressing the entire space is denoted X, and is defined by the following equation.

$$X \subset \mathbb{R}$$

$x \in X$ are input variables. X corresponds to an overall city, and x corresponds to a latitude and longitude. $s=1, \ldots, S$ are arguments indicating S types of aggregate data, and $P_s$ expresses a partition of X for an $s^{th}$ aggregate data. Note that partitions correspond to partitions of the city into addresses or districts. $|P_s|$ expresses a number of regions included in the partition $P_s$. For regions of argument $n=1, \ldots, |P_s|$, an $n^{th}$ region is denoted $R_{s,n}$ ($R_{s,n} \in P_s$). An $n^{th}$ observation included in the $s^{th}$ aggregate data is expressed as a ($R_{s,n}$, $y_{s,n}$) pairing of the region $R_{s,n}$ with a value $y_{s,n}$ ($y_{s,n} \in \mathbb{R}_-$ ($\mathbb{R}_-$ being the double-lined R of the equations)). The aggregate data stored in the aggregate data storage section 101 is $\{(R_{s,n}, y_{s,n}) | s=1, \ldots, S, n=1, \ldots, |P_s|\}$. Note that in the present specification, the notation $\mathbb{R}_-$ is used to represent the "double-lined R" in the equations, whereas otherwise R is used to represent "region". Although explanation is given regarding a case in which x has two-dimensions corresponding to latitude and longitude, there is no limitation thereto. x may have one-dimension or may have three or more dimensions. For example, x may be a one-dimensional expression of time. Alternatively, x may have four-dimensions expressing the three dimensions of latitude, longitude, and altitude as well as one dimension for time. A set of partitions included in Ps may be a subset of the entire space X. Namely, from out of the spatial partitions obtained by subdividing the entire space X, there may be spatial partitions without values.

The target partition storage section 102 is stored with target partitions obtained by subdividing space at a target granularity of high resolution data for output from the resolution enhancement section 105. The target partition storage section 102 reads a target partition according to a request from the resolution enhancement section 105, and transmits the appropriate data to the device. Target partition refers to subdividing space at a higher resolution granularity than that of subject aggregate data. Hereafter, $P^{target}$ expresses a target partition of X. One region included in the target partition $P^{target}$ is expressed as $R^{target}$. Note that any freely selected target partition $P^{target}$ may be employed. For example, partitions based on addresses or districts, or a mesh of any freely selected size set by a user may conceivably be employed as the target partition $P^{target}$. The target partition storage section 102 is stored with plural target partitions $P^{target}$ of different granularities.

Note that the aggregate data storage section 101 and the target partition storage section 102 may be configured by a web server, or a database server equipped with a database, or the like.

The operation section 103 receives various operations from a user with respect to the aggregate data and the target partition $P^{target}$ stored in the aggregate data storage section 101 and in the target partition storage section 102 respectively. Examples of respective operations include operations to register, correct, or delete aggregate data or data relating to the target partition $P^{target}$. The operation section 103 further performs operations with respect to the aggregate data and the target partition $P^{target}$ stored in the aggregate data storage section 101 and the target partition storage section 102 respectively in response to the various operations received. The aggregate data stored in the aggregate data storage section 101 and the target partition storage section 102 is stored in advance by the operation section 103 based on respective operations received from the user.

The reception section 104 receives the aggregate data subject to resolution enhancement and receives a designation of the target partition $P^{target}$ indicating to subdivide space with higher resolution granularity than the subject aggregate data. Specifically, the reception section 104 receives designations of arguments for the aggregate data subject to resolution enhancement and the target partition $P^{target}$. The reception section 104 then passes the received designations to the resolution enhancement section 105.

For the aggregate data and target partition designated by the reception section 104, the resolution enhancement section 105 predicts high resolution data obtained by enhancing the resolution of the designated aggregate data to the granularity indicated by the target partition $P^{target}$. Specifically, the resolution enhancement section 105 includes a parameter estimation section 106, a spatial scale parameter storage section 107, a mixing coefficient storage section 108, a residual variance parameter storage section 109, a noise variance parameter storage section 110, and a high resolution data computation section 111.

The parameter estimation section 106 performs estimation for aggregate data of values associated with respective regions obtained by subdividing a space and for a Gaussian process model that expresses plural aggregate data of different partition granularities. This estimation is performed based on the Gaussian process model including a spatial scale parameter of a correlation function between regions of the aggregate data, a noise variance parameter of the correlation function, mixing coefficients of the Gaussian process and the aggregate data, and a residual variance parameter for the Gaussian process, by estimating a spatial scale parameter, a noise variance parameter, mixing coefficients, and a residual variance parameter so as to maximize a function expressing values of the aggregate data by area integrals of a Gaussian process.

Specifically, the parameter estimation section 106 first acquires aggregate data from the aggregate data storage section 101. Next, based on the acquired aggregate data the parameter estimation section 106 incorporates the spatial scale parameter, the mixing coefficients, the residual variance parameter, and the noise variance parameter as unknown variables, and then simultaneously models plural aggregate data based on a multivariate Gaussian process model expressed by a linear mix of plural latent Gaussian processes. The parameter estimation section 106 then employs maximum likelihood estimation to estimate the spatial scale parameter, the mixing coefficients, the residual variance parameter, and the noise variance parameter configuring the unknown variables of the multivariate Gaussian process model. Detailed explanation follows regarding the multivariate Gaussian process model and the parameter estimation.

Multivariate Gaussian Process Model

First we will formulate the multivariate Gaussian process model expressed by a linear mix of plural latent Gaussian processes. L individual Gaussian process are defined by Equation (1) below.

$$g_l(x) \sim \mathcal{GP}(0, \gamma_l(x, x')), l=1, \ldots L \quad (1)$$

In Equation (1), $\gamma_l$ (x, x'): X×X→R_ is a correlation function for an $l^{th}$ Gaussian process (l being lower case letter L), and any freely selected correlation function may be employed therefor. For example, Equation (2) below may be employed as the correlation function of the $l^{th}$ Gaussian process.

$$\gamma_l(x, x') = \exp\left(-\frac{1}{2\beta_l^2}\|x - x'\|^2\right) \quad (2)$$

In Equation (2), $\beta_l$ is the spatial scale parameter for the $l^{th}$ correlation function. $f_s(x)$ is a noiseless latent function for $s^{th}$ aggregate data, and an S dimensional Gaussian process $f(x)=(f_1(x), \ldots, f_s(x))^T$ is expressed by Equation (3) below as a linear mix of the L individual Gaussian processes.

$$f(x)|g(x) \sim \mathcal{N}(f(x)|Wg(x), \Lambda) \quad (3)$$

In Equation (3), $g(x)=g_1(x), \ldots, g_L(x))^T$ wherein W (the bold letter W in the equation) is an S×L mixing matrix, and the (s, l) elements $w_{s,l} \in R\_$ are the mixing coefficients. Moreover, $\Lambda$=diag ($\lambda_1^2, \ldots, \lambda_s^2$), and the respective elements $\lambda_s^2$ are a residual variance parameter for the $s^{th}$ Gaussian process. g(x) may be integrated out, with the result that the S dimensional Gaussian process may be written as in Equation (4) below.

$$f(x) \sim \mathcal{GP}(0, K(x, x')) \quad (4)$$

Wherein Equation (4), K (x, x'): X×X→$R^{S \times S}$ expresses a correlation matrix as per Equation (5) below.

$$K(x,x')=W\Gamma(x,x')W^T+\Lambda \quad (5)$$

In Equation (5), $\Gamma(x, x')$=diag ($\gamma_1(x, x'), \ldots, \gamma_L(x, x')$). Moreover, the (s, s') element of K(x, x') is given by Equation (6) below.

$$k_{s,s'}(x, x') = \delta_{s,s'}\lambda_s^2 + \sum_{l=1}^{L} w_{s,l} w_{s',l} \gamma_l(x, x') \quad (6)$$

Here, $\delta_{A, B}$ is a Kronecker delta (wherein A and B are arbitrary symbols). $\delta_{A, B}=1$ in cases in which A=B and $\delta_{A, B}=0$ in other cases.

Note that the following equation may be employed as a substitute for Equation (3) above.

$$f(x)=Wg(x)+n(x), n(x) \sim GP(0,\Lambda(x,x'))$$

The S dimensional Gaussian process is not limited to that described above. For example, a method based on process convolution (see "Dependent Gaussian Processes" by P. Boyle and M. Frean in NeurIPS, pages 217 to 224, 2005) may be employed to formulate the S dimensional Gaussian process.

Next, values of aggregate data are expressed by area integrals of a Gaussian process. An observation vector $y_s$ of dimension $|P_s|$ generated from the $s^{th}$ Gaussian process is expressed by the following equation.

$$y_s=(y_{s,1}, \ldots, y_{s,|P_s|})^T$$

Then, the observation vector y generated from the S Gaussian processes is collectively expressed according to Equation (7) below.

$$y = \begin{pmatrix} y_1 \\ y_2 \\ \vdots \\ y_s \end{pmatrix} \quad (7)$$

The observation vector y is assumed to conform to Equation (8) below, this being a multi-dimensional Gaussian distribution.

$$y|f(x) \sim \mathcal{N}(y|\int_x A(x)f(x)dx, \Sigma) \quad (8)$$

Note that although explanation is given regarding a case in which the observation vector y is assumed to conform to a multi-dimensional Gaussian distribution, there is no limitation thereto. The observation vector y may be assumed to conform to any freely selected probability distribution other than a normal distribution, according to the characteristics of the data. For example, in the case of count data, such data may be assumed to conform to a Poisson distribution. In such cases, it becomes necessary to employ an approximate estimation method such as variational inference instead of parameter estimation based on a simple marginal distribution. Namely, the marginal likelihood of Equation (8) is not able to be subjected to analytical computation. For example, parameter estimation may be performed by applying variational inference or the like (see "Variational learning of inducing variables in sparse Gaussian processes" by M. Titsias, in AISTATS, pages 567 to 574, 2009).

In Equation (8), N is defined according to the equation below, and $A(x): X \rightarrow R\_^{N \times S}$, and $A(x)$ are expressed by Equations (9) below.

$$N = \Sigma_{s=1}^{S} |\mathcal{P}_s|$$

$$A(x) = \begin{pmatrix} a_1(x) & 0 & \ldots & 0 \\ 0 & a_2(x) & \ldots & 0 \\ \vdots & \vdots & \ddots & \vdots \\ 0 & 0 & \ldots & a_S(x) \end{pmatrix} \quad (9)$$

In Equation (9), $a_s(x)$ is defined as in the equation below, and the zeros in bold in Equation (9) are vectors of 0.

$$a_s(x) = (a_{s,1}(x), \ldots, a_{s,|\mathcal{P}_e|}(x))^T$$

Any freely selected value may be employed as $a_{s,n}(x)$, and the aggregation method may be changed for each region by the method used to set $a_{s,n}(x)$. In this case, region averages are employed for each region $R_{s,n}$, and cases in which results and observations are obtainable are considered. In such cases, $a_{s,n}(x)$ can be written as in Equation (10) below.

$$a_{s,n}(x) = \frac{\mathbb{1}(x \in \mathcal{R}_{s,n})}{\int_X \mathbb{1}(x' \in \mathcal{R}_{s,n}) dx'} \quad (10)$$

The "double-lined number 1" in this equation is represented by Q in the specification. In Equation (10), Q(C) is an instruction function (wherein C is any freely selected logical expression). Q(C)=1 in cases in which C is true, and Q(C)=0 in other cases. Σ in Equation (8) above is defined as in (11) below.

$$\Sigma = \begin{pmatrix} \sigma_1^2 I & 0 & \ldots & 0 \\ 0 & \sigma_2^2 I & \ldots & 0 \\ \vdots & \vdots & \ddots & \vdots \\ 0 & 0 & \ldots & \sigma_S^2 I \end{pmatrix} \quad (11)$$

In Equation (11), $\sigma_s^2$ is a noise variance parameter for the $s^{th}$ Gaussian process, the bold letter I is the identity matrix, the bold letter Os are matrices with elements of 0.

Namely, parameters to be estimated by the parameter estimation section 106 are a spatial scale parameter β={β_l=1, . . . , L}, mixing coefficients W, a residual variance parameter A, and a noise variance parameter E.

Parameter Estimation

Next, explanation follows regarding methods by which the parameter estimation section 106 estimates the spatial scale parameter β, the mixing coefficients W, the residual variance parameter Λ, and the noise variance parameter Σ by employing maximum likelihood estimation. Given observation vector y then a marginal likelihood p(y) may be written as in Equation (12) below by integrating out f(x).

$$p(\mathcal{Y}) = \mathcal{N}(\mathcal{Y}|0, C) \quad (12)$$

Wherein C is an S×S block correlation matrix, and may be written as in Equations (13) and (14) below.

$$C = \int\int_{X \times X} A(x) K(x, x') A(x')^T dx dx' + \sum \quad (13)$$

$$= \begin{pmatrix} C_{1,1} & C_{1,2} & \ldots & C_{1,S} \\ C_{2,1} & C_{2,2} & \ldots & C_{2,S} \\ \vdots & \vdots & \ddots & \vdots \\ C_{S,1} & C_{S,2} & \ldots & C_{S,S} \end{pmatrix} \quad (14)$$

Moreover, $C_{s,s'}$ is a $|P_s| \times |P_{s'}|$ matrix as in Equation (15) below.

$$C_{s,s'} = \iint_{X \times X} k_{s,s'}(x,x') a_s(x) a_s(x')^T dx dx' + \delta_{s,s'} \sigma_s I \quad (15)$$

The (n,n') element of $C_{s,s'}$ is written as $C_{s,s'}(n,n')$, and expresses a correlation between an $n^{th}$ region of the $s^{th}$ aggregate data and an $n'^{th}$ region of the $s'^{th}$ aggregate data. Analytically computing the area integral in Equation (15) is difficult and so computation by discrete approximation is performed thereon. Note that the "cursive letter G" in the equations is expressed by the letter G in the specification. By discrete approximation, an input space X is subdivided into a sufficiently fine grid, and a set of grid points included in the region $R_{s,n}$ is denoted $G_{s,n}$. Employing $G_{s,n}$ enables $C_{s,s'}(n, n')$ approximation computation according to Equations (16) to (18) below.

$$C_{S,S'}(n, n') = \iint_{X \times X} k_{S,S'}(x, x') a_{s,n}(x) a_{s',n'}(x') dx dx' + \delta_{s,s'} \sigma_s \quad (16)$$

$$\approx \sum_{i \in \mathcal{G}_{s,n}} \sum_{j \in \mathcal{G}_{s',n'}} k_{s,s'}(i, j) a_{s,n}(i) a_{s',n'}(j) + \delta_{s,s'} \sigma_s \quad (17)$$

$$\approx \frac{1}{|\mathcal{G}_{s,n}|} \frac{1}{|\mathcal{G}_{s',n'}|} \sum_{i \in \mathcal{G}_{s,n}} \sum_{j \in \mathcal{G}_{s',n'}} k_{s,s'}(i, j) + \delta_{s,s'} \sigma_s \quad (18)$$

Equation (19) below is obtained by taking a logarithm of the marginal likelihood p(y) expressed by Equation (12) and extracting only terms relating to the parameters to be estimated.

$$\log p(y|W, \beta, \Lambda, \Sigma) \propto -\tfrac{1}{2} y^T C^{-1} y - \tfrac{1}{2} \log(\det(C)) \quad (19)$$

Maximizing Equation (19) enables a solution for a maximum likelihood estimation to be obtained for the spatial scale parameter β, the mixing coefficients W, the residual variance parameter Λ, and the noise variance parameter Σ. An optimization problem for maximization may, for example, be solved by employing a BFGS method (see Reference Document 1).

Reference Document 1: "On the limited memory BFGS method for large scale optimization" by D. C. Liu and J. Nocedal in Mathematical Programming 45 (1 to 3): 503 to 528, 1989.

Explanation follows regarding a parameter estimation method in a case in which aggregate data has been obtained for plural cities. Assume that there are V types of city. In this case, the aggregate data for each city is assumed to conform to a conditionally-independent probability distribution when given a common latent Gaussian process {g_l(x)|l=1, . . . , L} and a mixing matrix W. Given the aggregate data of the plural cities, the marginal likelihood p(y) can be written as Equation (20) below.

$$p(y^{(1)}, y^{(2)}, \ldots, y^{(V)}) = \prod_{v=1}^{V} \mathcal{N}(y^{(v)} | 0, C^{(v)}) \quad (20)$$

In Equation (20), $y^{(v)}$ is an observation vector for a $v^{th}$ city, and $C^{(v)}$ is a correlation matrix for the $v^{th}$ city. Equation (20) is maximized using a similar procedure to that employed for a single city case, thereby enabling a maximum likelihood estimation solution to be obtained for the spatial scale parameter β, the mixing coefficients W, the residual variance parameter Λ, and the noise variance parameter Σ.

The parameter estimation section 106 then stores the estimated spatial scale parameter β in the spatial scale parameter storage section 107. The parameter estimation section 106 stores the mixing coefficients W in the mixing coefficient storage section 108. The parameter estimation section 106 stores the residual variance parameter Λ in the residual variance parameter storage section 109. The parameter estimation section 106 stores the noise variance parameter Σ in the noise variance parameter storage section 110.

The spatial scale parameter storage section 107 is stored with the spatial scale parameter β estimated by the parameter estimation section 106. The mixing coefficient storage section 108 is stored with the mixing coefficient W estimated by the parameter estimation section 106. The residual variance parameter storage section 109 is stored with the residual variance parameter Λ estimated by the parameter estimation section 106. The noise variance parameter storage section 110 is stored with the noise variance parameter Σ estimated by the parameter estimation section 106. The spatial scale parameter storage section 107, the mixing coefficient storage section 108, the residual variance parameter storage section 109, and the noise variance parameter storage section 110 may have any configuration capable of saving and recovering the stored estimated values. For example, a configuration may be adopted in which storage is performed in a database or in a pre-prepared designated area of a generic storage device (such as memory or a hard disk device).

The high resolution data computation section 111 employs a Gaussian process model including the spatial scale parameter β, the noise variance parameter Σ, the mixing coefficients W, and the residual variance parameter Λ estimated by the parameter estimation section 106 to compute high resolution data in which the resolution of the subject aggregate data is enhanced by taking area integrals of values of the subject aggregate data, by computation for each region obtained by subdividing space at the granularity indicated by the target partition $P^{target}$.

Specifically, the high resolution data computation section 111 performs area integration of the Gaussian process model for each region included in the target partition $P^{target}$ under the conditions given to the aggregate data of the plural cities so as to compute desired high resolution data. Explanation follows regarding the method for computing the high resolution data.

First, the high resolution data computation section 111 derives an ex-post process $f^*(x)$ of an S dimensional Gaussian process $f(x)$ including the spatial scale parameter β, the noise variance parameter Σ, the mixing coefficients W, and the residual variance parameter Λ estimated by the parameter estimation section 106. The ex-post process $f^*(x)$ can be written as Equation (21) below.

$$f^*(x) \sim \mathcal{G}P(m^*(x), K^*(x,x')) \quad (21)$$

In Equation (21), $m^*(x): X \to R\_^S$ expresses an average vector, and $K^*(x,x'): X \times X \to R^{S \times S}$ expresses a correlation matrix. $H(x): X \to R\_^{N \times S}$ is as in Equations (22) and (23) below.

$$H(x) = \int_X A(x')K(x,x')dx' \quad (22)$$

$$= \begin{pmatrix} h_{1,1}(x) & h_{1,2}(x) & \ldots & h_{1,S}(x) \\ h_{2,1}(x) & h_{2,2}(x) & \ldots & h_{2,S}(x) \\ \vdots & \vdots & \ddots & \vdots \\ h_{S,1}(x) & h_{S,2}(x) & \ldots & h_{S,S}(x) \end{pmatrix} \quad (23)$$

In Equation (23), $h_{s,s'}(x)$ is as Equation (24) below.

$$h_{s,s'}(x) = \int_X a_s(x')k_{s,s'}(x',x)dx' \quad (24)$$

Since the area integral of Equation (24) is unable to be analytically computed, discrete approximation is performed thereon, similarly to in Equation (18) above. Employing a set of grid points $G_{s,n}$ enables an $n^{th}$ element of $h_{s,s'}(x)$ to be computed according to Equations (25) and (26) below.

$$\int_X a_{s,n}(x')k_{s,s'}(x',x)dx' \approx \sum_{i \in G_{s,n}} a_{s,n}(i)k_{s,s'}(i,x) \quad (25)$$

$$\approx \frac{1}{|G_{s,n}|} \sum_{i \in G_{s,n}} k_{s,s'}(i,x) \quad (26)$$

$h_{s,s'}(x)$ is employed, and $m^*(x)$ and $K^*(x,x')$ are expressed by Equations (27) and (28) below.

$$m^*(x) = m(x) + H(x)^T C^{-1}(y-\mu), \quad (27)$$

$$K^*(x,x') = K(x,x') - H(x)^T C^{-1} H(x) \quad (28)$$

The high resolution data to be computed can be obtained by integrating the ex-post average of Equation (27) for each region in the target partition $P^{target}$. Moreover, a reliability of the high resolution data computed thereby is obtained by integrating Equation (28) for each region in the target partition $P^{target}$.

Consider a case in which a designated argument of the aggregate data in the reception section 104 is denoted s, and a predicted value of the region $R^{target}$ included in the target partition $P^{target}$ is computed. When this is performed, if an $s^{th}$ element of the ex-post average $m^*(x)$ is denoted $m_s^*(x)$, then the predicted value sought is as in Equations (29) and (30) below.

$$\int_X a^{target}(x)m_s^*(x)dx \approx \sum_{i \in G^{target}} a^{target}(i)m_s^*(i) \quad (29)$$

$$\approx \frac{1}{|G^{target}|} \sum_{i \in G^{target}} m_s^*(i) \quad (30)$$

Wherein $a^{target}(x)$ is as in Equation (31) below.

$$a^{target}(x) = \frac{\mathbb{1}(x \in R^{target})}{\int_X \mathbb{1}(x' \in R^{target})dx'} \quad (31)$$

The integral of Equation (29) is performed by discrete approximation and a set of grid points included in the region $R^{target}$ is denoted $G^{target}$. The high resolution data computation section 111 repeats the above processing for each region included in the target partition $P^{target}$ so as to obtain the desired high resolution data. The high resolution data computation section 111 passes the computed high resolution data to the output section 112.

Figure 3:
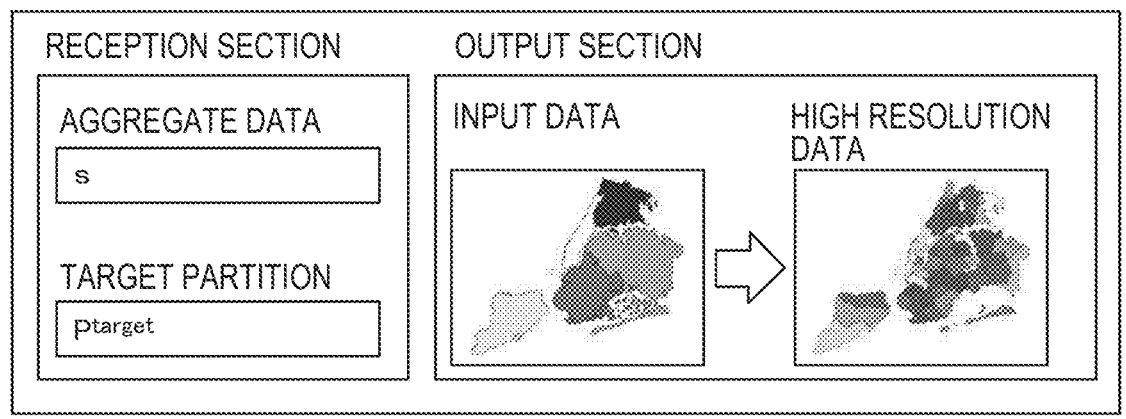
FIG. 3 is a diagram illustrating an example of output of an aggregate data resolution enhancement device according to an exemplary embodiment.

The output section 112 outputs the high resolution data computed by the high resolution data computation section 111. FIG. 3 illustrates an example of output by the output section 112. As illustrated in FIG. 3, the output section 112 receives arguments of subject aggregate data and a target partition from the reception section 104, and displays a visual result at high resolution data corresponding thereto. The color darkness of the visual result is set so as to be proportional to the data values. Such an output example can be utilized to focus in more detail on regions with high poverty levels or regions with high air pollution levels, enabling more appropriate intervention to be planned.

Operation of Aggregate Data Resolution Enhancement Device According to Exemplary Embodiment of Technology Disclosed Herein Next, explanation follows regarding operation of the aggregate data resolution enhancement device 10.

Figure 4:
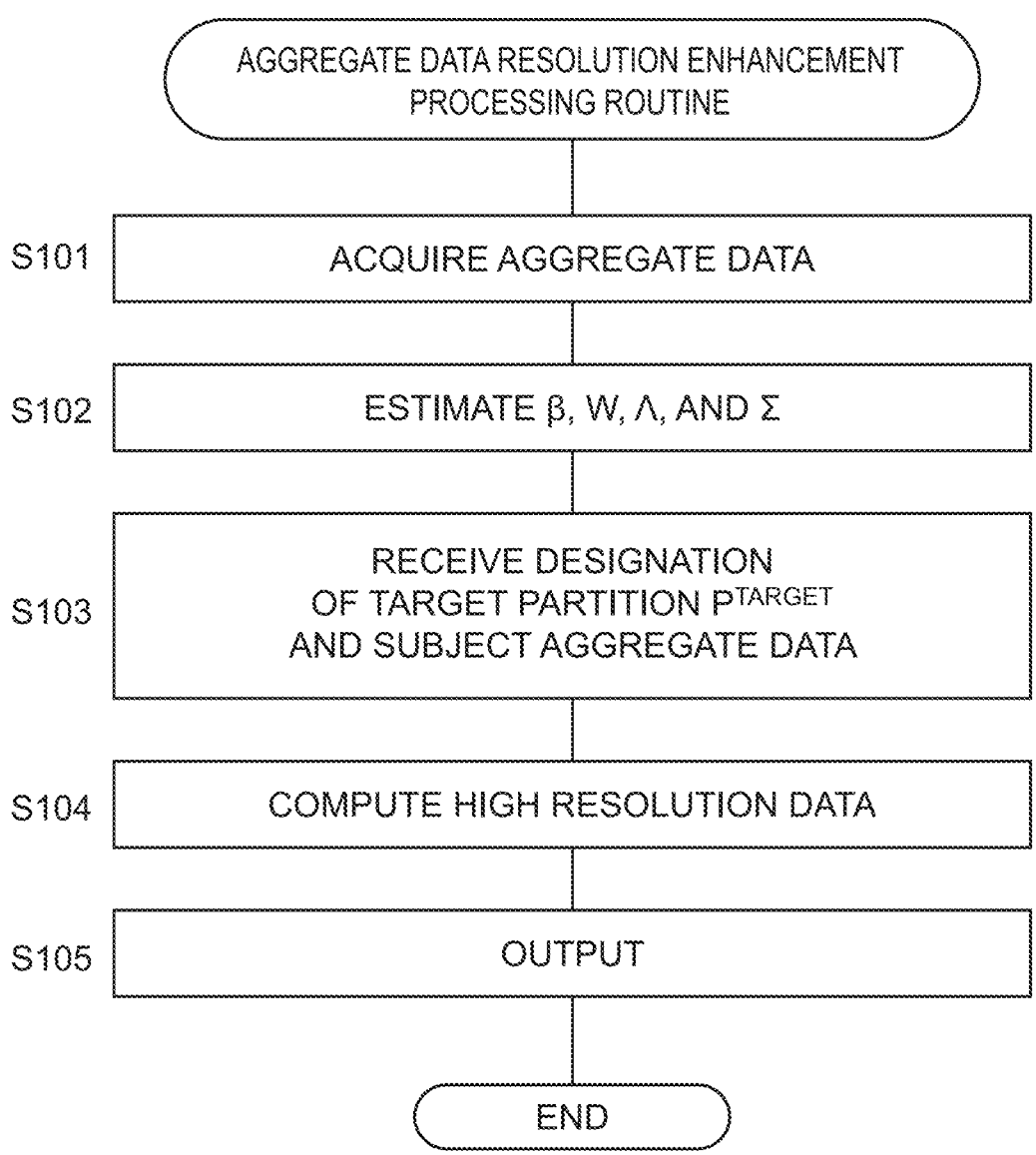
FIG. 4 is a flowchart illustrating an aggregate data resolution enhancement processing routine of an aggregate data resolution enhancement device according to an exemplary embodiment.

FIG. 4 is a flowchart illustrating a flow of aggregate data resolution enhancement processing by the aggregate data resolution enhancement device 10. This aggregate data resolution enhancement processing is performed by the CPU 11 reading the aggregate data resolution enhancement program from the ROM 12 or the storage 14 and expanding and executing the aggregate data resolution enhancement program in the RAM 13.

At step S101, the CPU 11 functions as the parameter estimation section 106 by acquiring aggregate data from the aggregate data storage section 101.

At step S102, the CPU 11 functions as the parameter estimation section 106 by performing estimation for aggregate data of values associated with respective regions obtained by subdividing a space and for a Gaussian process model that expresses plural aggregate data with different granularities of partition. The estimation is performed based on the Gaussian process model including the spatial scale parameter $\beta$ of a correlation function between regions of the aggregate data, the noise variance parameter $\Sigma$ of a correlation function, the mixing coefficients W for the Gaussian processes and the aggregate data, and the residual variance parameter $\Lambda$ for the Gaussian process, by estimating the spatial scale parameter $\beta$, the noise variance parameter $\Sigma$, the mixing coefficients W, and the residual variance parameter $\Lambda$ so as to maximize a function expressing the values of this aggregate data by area integrals of a Gaussian process.

At step S103, the CPU 11 functions as the reception section 104 by receiving a designation of the aggregate data subject to resolution enhancement and a designation of the target partition $P^{target}$ indicating to subdivide space at a higher resolution granularity than that of the subject aggregate data.

At step S104, the CPU 11 functions as the high resolution data computation section 111 by performing computation in the Gaussian process model including the spatial scale parameter $\beta$, the noise variance parameter $\Sigma$, the mixing coefficients W, and the residual variance parameter $\Lambda$ estimated at step S102, by computing high resolution data in which the resolution of the subject aggregate data is enhanced by taking area integral of values of the subject aggregate data, by computation for each region obtained by subdividing space at the granularity as designated by the target partition $P^{target}$ at step S103.

At step S105, the CPU 11 functions as the output section 112 by outputting the high resolution data computed at step S104.

As described above, the aggregate data resolution enhancement device according to the present exemplary embodiment performs estimation, for the aggregate data of values associated with respective regions obtained by subdividing a space and for the Gaussian process model that expresses plural aggregate data with different partition granularities. This estimation is performed based on the Gaussian process model including the spatial scale parameter of a correlation function between regions of the aggregate data and the noise variance parameter of the correlation function, by estimating the spatial scale parameter and the noise variance parameter so as to maximize a function expressing values of the aggregate data by area integrals of a Gaussian process. The aggregate data resolution enhancement device receives aggregate data subject to resolution enhancement and a designation of the target partition indicating to subdivide space at a higher resolution granularity than that of the subject aggregate data. The aggregate data resolution enhancement device then, in the Gaussian process model including the estimated spatial scale parameter and the noise variance parameter, computes high resolution data in which the resolution of the subject aggregate data is enhanced by taking area integrals of the values of the subject aggregate data, by computation for each region obtained by subdividing space at the granularity indicated by the target partition. This enables spatial correlation between regions having various sizes and shapes to be accurately evaluated, and enables the resolution of the aggregate data to be enhanced to a good level of precision.

In the aggregate data resolution enhancement device according to the present disclosure, the Gaussian process model includes a spatial scale parameter, a noise variance parameter, mixing coefficients of the Gaussian process and the aggregate data, and a residual variance parameter for the Gaussian process. The aggregate data resolution enhancement device estimates the spatial scale parameter, the noise variance parameter, the mixing coefficients, and the residual variance parameter so as to maximize a function expressing values of the aggregate data by area integrals of a Gaussian process. The aggregate data resolution enhancement device then, in the Gaussian process model including the estimated spatial scale parameter, noise variance parameter, mixing coefficients, and residual variance parameter, computes high resolution data in which the resolution of the subject aggregate data is enhanced by taking area integrals of the values of the subject aggregate data, by computation for each region obtained by subdividing the space at the granularity indicated by the target partition. This enables the resolution of the aggregate data to be enhanced with an even higher level of precision.

TEST EXAMPLES

Data Sets

Aggregate data relating to two cities is employed. Specifically, ten sets of aggregate data relating to New York City and three sets of aggregate data relating to Chicago are employed to evaluate the methodology described in the foregoing exemplary embodiment. Various types of aggregate data were employed, including aggregate data relating to poverty levels, air pollution levels, crime rates, and the like. Each aggregate data was associated with one of plural predefined partitions at various granularity.

Evaluation Task

The plural aggregate data were employed in performing a task of enhancing the resolution of coarse granularity aggregate data and the performance of the resolution enhancement of the aggregate data was evaluated. For this evaluation, data subdivided using a fine granularity and data subdivided using a granularity coarser than that data were prepared for each of the aggregate data. When estimating parameters of the Gaussian process model, a single piece of data subjected to resolution enhancement was selected, and a version of this data subdivided with coarse granularity and a version of other data subdivided with fine granularity were employed to predict high resolution data for the subject data, which was then compared against pre-prepared aggregate data subdivided with fine granularity to perform error evaluation. A similar method was employed to perform error evaluation for each data set by employing each data set as the subject of resolution enhancement.

A mean absolute percentage error (MAPE), expressed by the equation below, was employed as an evaluation index.

$$\frac{1}{|\mathcal{P}_{s'}|} \sum_{n \in \mathcal{P}_{s'}} |(y^{true}_{s',n} - y^{*}_{s',n})/y^{true}_{s',n}|$$

Wherein $P_{s'}$ is a partition of X for an $s'^{th}$ aggregate data and is a partition subdivided with targeted fine granularity of partition. $y^{true}_{s',n}$ is a true value of a region n of aggregate data of fine granularity, and $y^{*}_{s',n}$ is a predicted value for the region n of the aggregate data of fine granularity.

Gaussian Process Model Setting

A zero average Gaussian processes was employed as the plural latent Gaussian processes. The following squared exponential kernel was employed as a covariant function of the latent Gaussian processes.

$$\gamma_l(x,x') = \alpha_l^2 \exp(-\|x-x'\|^2/2\beta_l^2)$$

Wherein $\alpha^2_l$ is a signal variance to control the magnitude of the covariance. $\alpha^2_l=1$ was adopted. A covariant function $n(x, x')$ of a Gaussian noise process was set in the following manner.

$$\Lambda(x,x') = \text{diag}(\lambda_1^2 \delta(x-x'), \ldots, \lambda_S^2 \delta(x-x'))$$

Note that $\delta(\cdot)$ is a Dirac delta function.

A number L of latent Gaussian processes was chosen from $\{1, \ldots, S\}$ by cross-validation.

Baseline

The methods described in Non-Patent Documents 1 and 2 described above were employed as comparative examples. In the following explanation, the method described in Non-Patent Document 1 is referred to as "2-stage GP", and the method described in Non-Patent Document 2 is referred to as "SLFM", while the method described in the foregoing exemplary embodiment is referred to as "SAGP".

Resolution Enhancement Results

Evaluation results for the respective methods of "2-stage GP", "SLFM", and "SAGP" are listed in Table 1. Table 1 illustrates both MAPE and standard error for each aggregate data and each method.

|  | New York City | | | Chicago |
| --- | --- | --- | --- | --- |
|  | Poverty rate | PM2.5 | Crime | Poverty rate |
| 2-stage GP | 0.210 ± 0.022 | 0.042 ± 0.005 | 0.454 ± 0.075 | 0.380 ± 0.060 |
| SLFM | 0.207 ± 0.025 | 0.036 ± 0.005 | 0.401 ± 0.053 | 0.335 ± 0.052 |
| SAGP | 0.177 ± 0.019 | 0.030 ± 0.005 | 0.379 ± 0.055 | 0.278 ± 0.032 |

Figure 5:
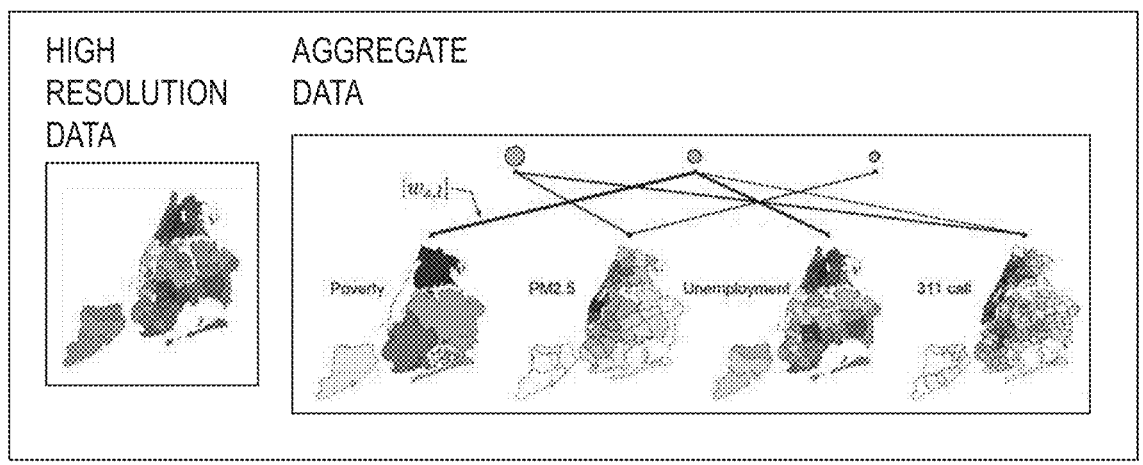
FIG. 5 is a diagram illustrating an example of output of an aggregate data resolution enhancement device according to a modified example of an exemplary embodiment.

FIG. 5 illustrates resolution enhancement results from SAGP relating to data for poverty levels. Note that the predicted values of each model are normalized to a range [0, 1], and darker colors indicate regions with higher values.

The radii of the circles displayed above the respective aggregate data indicate a scale parameter of each of the latent Gaussian processes. Moreover, the widths of the edges connecting the aggregate data to the circles are proportional to absolute values of a weight wo applied to combine an $s^{th}$ aggregate data with an $l^{th}$ latent Gaussian process. Note that such edges are omitted in the case of combinations for which the absolute value of the weight is below a threshold value.

Figure 6:
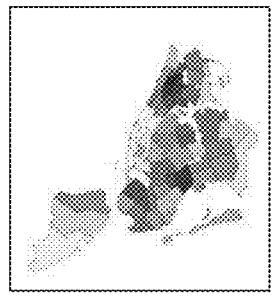
FIG. 6 is a diagram illustrating true values of aggregate data in a test example.

It can be seen from a comparison with the true data in FIG. 6 that accurate high resolution data could be obtained. FIG. 5 is a visualization of the weights w for a mixture of the latent Gaussian processes and scale parameters estimated by SAGP when enhancing the resolution of the aggregate data. Four sets of aggregate data that are employed when enhancing the resolution of the aggregate data are shown, namely poverty levels, PM 2.5, unemployment rates, and number of 311 calls for New York City. The edges used to visualize the mixture weights visualize correlation relationships between respective aggregate data. For example, the strong correlation relationship between the aggregate data relating to poverty levels and aggregate data relating to unemployment rates has been visualized. Note that poverty levels, PM 2.5, unemployment rates, and 311 calls are examples of types of values.

The time taken to compute the data sets for New York City using a 3.1 GHz Intel (registered trademark) Core i7 was 1728.1 seconds, whereas the time taken to compute the data sets for Chicago was 115.1 seconds.

Moreover, SAGP may be employed in transfer learning between plural cities. This approach is effective in cases in which there is little usable data for a single city.

Note that the present disclosure is not limited to the exemplary embodiment described above, and various modifications and applications are possible within a range not departing from the spirit of the present disclosure.

Modified Example 1

In the exemplary embodiment described above and as illustrated in FIG. 3, an example has been described in which the output section 112 outputs subject aggregate data and visualization results of high resolution data. However, there is no limitation thereto. For example, as illustrated in FIG. 5, the output section 112 may output visualization results for high resolution data and visualization results for plural aggregate data subjected to processing to enhance the resolution of the aggregate data. In such cases, circles indicating the scale parameter of the respective latent Gaussian processes are displayed above the respective aggregate data, and edges are displayed to connect the aggregate data to these circles. This enables visualization of a weight wo of a combination of the $s^{th}$ aggregate data and the $l^{th}$ latent Gaussian process, and also enables visualization correlation relationships between aggregate data. The edges connecting the aggregate data to the circles and the widths of the edges enable visualization of which aggregate data is considered important in the resolution enhancement processing. Alternatively, the reliability of the high resolution data may be visualized along with the visualization results of the high resolution data. Moreover, it is possible to ascertain cause-and-effect relationships between aggregate data. For example, when there is a desire to improve poverty levels, indices that appear to be related thereto (for example rates of infectious disease) can be ascertained.

Modified Example 2

In the exemplary embodiment described above, an example has been described in which the reception section 104 receives a designation of the aggregate data subject to resolution enhancement from out of plural aggregate data employed by the parameter estimation section 106. However, there is no limitation thereto. For example, the reception section 104 may be configured so as to receive input of the aggregate data to be subjected to resolution enhancement separately to the aggregate data stored in the aggregate data storage section 101. In such cases, the reception section 104 receives input of the aggregate data subject to resolution enhancement and a designation of the target partition $P^{target}$ indicating to subdivide space at a higher resolution granularity than that of the subject aggregate data. Based on the aggregate data received by the reception section 104 and on the plural aggregate data acquired from the aggregate data storage section 101, the parameter estimation section 106 simultaneously models the plural aggregate data sets using a multivariate Gaussian process model expressed by a linear mix of plural latent Gaussian processes, and thereby using maximum likelihood estimation estimates a spatial scale parameter, mixing coefficients, a residual variance parameter, and a noise variance parameter, which are the unknown variables of the multivariate Gaussian process model. As illustrated in FIG. 5, the output section 112 may also be configured so as to output visualization results of the high resolution data and visualization results for plural aggregate data sets that have been subjected to processing to enhance the resolution of the aggregate data. In such cases, an operator is able to adjust the partition granularity of the input aggregate data subject to resolution enhancement by looking at the visualization results.

Moreover, the aggregate data resolution enhancement program executed by the CPU reading software (a program) in the exemplary embodiment described above may be executed by various types of processor other than a CPU. Such processors include graphics processing units (GPU), programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The aggregate data resolution enhancement program may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Moreover, in the exemplary embodiment described above, explanation has been given regarding a case in which the aggregate data resolution enhancement program is stored in advance (installed) in the storage 14. However, there is no limitation thereto. The program may be provided in a format stored on a non-transitory storage medium such as a compact disk read only memory (CD-ROM), digital versatile disk read only memory (DVD-ROM), or universal serial bus (USB) memory. Alternatively, the program may be configured in a format downloadable from an external device over a network.

The following supplements are also disclosed in relation to the foregoing exemplary embodiment.

Supplement 1

An aggregate data resolution enhancement device comprising:
  memory; and
  at least one processor coupled to the memory,
  the processor being configured to:
  perform estimation, for aggregate data in which values are associated with respective regions obtained by subdividing a space and for a Gaussian process model that expresses a plurality of aggregate data in which at least one of a type of value, the space, or a granularity of partition differs, by performing estimation based on the Gaussian process model including a spatial scale parameter of a correlation function between regions of the aggregate data and including a noise variance parameter of the correlation function, by estimating the spatial scale parameter and the noise variance parameter so as to maximize a function expressing values of the aggregate data by area integrals of a Gaussian process;
  receive aggregate data subject to resolution enhancement and a designation of a target partition indicating to subdivide space at a higher resolution granularity than that of the subject aggregate data; and
  perform computation in the Gaussian process model including the estimated spatial scale parameter and the noise variance parameter by computing high resolution data in which the resolution of the subject aggregate data is enhanced by taking area integrals of the values of the subject aggregate data, by computation for each region obtained by subdividing the space at the granularity indicated by the target partition.

Supplement 2

A non-transitory storage medium stored with a computer-executable program for executing aggregate data resolution enhancement processing,
  the aggregate data resolution enhancement processing comprising:
  performing estimation, for aggregate data in which values are associated with respective regions obtained by subdividing a space and for a Gaussian process model that expresses a plurality of aggregate data in which at least one of a type of value, the space, or a granularity of partition differs, by performing estimation based on the Gaussian process model including a spatial scale parameter of a correlation function between regions of the aggregate data and including a noise variance parameter of the correlation function, by estimating the spatial scale parameter and the noise variance parameter so as to maximize a function expressing values of the aggregate data by area integrals of a Gaussian process;
  receiving aggregate data subject to resolution enhancement and a designation of a target partition indicating to subdivide space at a higher resolution granularity than that of the subject aggregate data; and
  performing computation in the Gaussian process model including the estimated spatial scale parameter and the noise variance parameter, by computing high resolution data in which the resolution of the subject aggregate data is enhanced by taking area integrals of the values of the subject aggregate data, by computation for each region obtained by subdividing the space at the granularity indicated by the target partition.

Supplement 3

An aggregate data resolution enhancement device comprising:
  memory; and
  at least one processor coupled to the memory,
  the processor being configured to:
  perform optimization, for aggregate data in which values are associated with respective spatial partitions obtained by subdividing a D-dimensional space and for a Gaussian process model that expresses a plurality of aggregate data in which a granularity of partition differs, with the Gaussian process model also including a scale parameter of a correlation function between partial regions of the aggregate data and a noise variance parameter of the correlation function, by employing an objective function expressing values of the aggregate data by area integrals of a Gaussian process to optimize the scale parameter and the noise variance parameter;
  receive input of a selection of aggregate data subject to resolution enhancement from among the plurality of aggregate data and receive input of a designation of a target partition indicating to subdivide the D-dimensional space at a higher resolution granularity than that of the subject aggregate data; and
  compute high resolution data in which the resolution of the subject aggregate data is enhanced by taking area integrals in the optimized Gaussian process model for each spatial partition obtained by subdividing the D-dimensional space at the granularity indicated by the target partition.

Supplement 4

A non-transitory storage medium stored with a computer-executable program for executing aggregate data resolution enhancement processing,
  the aggregate data resolution enhancement processing comprising:
  performing optimization, for aggregate data in which values are associated with respective spatial partitions obtained by subdividing a D-dimensional space and for a Gaussian process model that expresses a plurality of aggregate data in which a granularity of partition differs, with the Gaussian process model also including a scale parameter of a correlation function between partial regions of the aggregate data and a noise variance parameter of the correlation function, by employing an objective function expressing values of the aggregate data by area integrals of a Gaussian process to optimize the scale parameter and the noise variance parameter;
  receiving input of a selection of aggregate data subject to resolution enhancement from among the plurality of aggregate data and receiving input of a designation of a target partition indicating to subdivide the D-dimensional space at a higher resolution granularity than that of the subject aggregate data; and
  computing high resolution data in which the resolution of the subject aggregate data is enhanced by taking area integrals in the optimized Gaussian process model for each spatial partition obtained by subdividing the D-dimensional space at the granularity indicated by the target partition Supplement 5

An aggregate data resolution enhancement device comprising:
  memory; and
  at least one processor coupled to the memory,
  the processor being configured to:
  for aggregate data of values associated with respective spatial partitions obtained by subdividing a D-dimensional space, receive input of aggregate data subject to resolution enhancement and receive input of a designation of a target partition indicating to subdivide the D-dimensional space at a higher resolution granularity than that of the subject aggregate data;
  for a Gaussian process model including the aggregate data subject to the resolution enhancement and that expresses a plurality of aggregate data in which at least one of a type of value, the D-dimensional space, or a granularity of partition differs, with the Gaussian process model also including a scale parameter of a correlation function between partial regions of the aggregate data and a noise variance parameter of the correlation function, to optimize the scale parameter and the noise variance parameter by employing an objective function expressing values of the aggregate data by area integrals of a Gaussian process; and
  compute high resolution data in which the resolution of the subject aggregate data is enhanced by taking area integrals in the optimized Gaussian process model for each spatial partition obtained by subdividing the D-dimensional space at the granularity indicated by the target partition.

Supplement 6

A non-transitory storage medium stored with a computer-executable program for executing aggregate data resolution enhancement processing,
  the aggregate data resolution enhancement processing comprising:
  for aggregate data of values associated with respective spatial partitions obtained by subdividing a D-dimensional space, receiving input of aggregate data subject to resolution enhancement and receiving input of a designation of a target partition indicating to subdivide the D-dimensional space at a higher resolution granularity than that of the subject aggregate data;
  for a Gaussian process model including the aggregate data subject to the resolution enhancement and that expresses a plurality of aggregate data in which at least one of a type of value, the D-dimensional space, or a granularity of partition differs, with the Gaussian process model also including a scale parameter of a correlation function between partial regions of the aggregate data and a noise variance parameter of the correlation function, optimizing the scale parameter and the noise variance parameter by employing an objective function expressing values of the aggregate data by area integrals of a Gaussian process; and
  computing high resolution data in which the resolution of the subject aggregate data is enhanced by taking area integrals in the optimized Gaussian process model for each spatial partition obtained by subdividing the D-dimensional space at the granularity indicated by the target partition.

Supplement 7

An aggregate data resolution enhancement device comprising:
  memory; and
  at least one processor coupled to the memory,
  the processor being configured to:
  for aggregate data of values associated with respective spatial partitions obtained by subdividing a D-dimensional space, receive a selection of aggregate data subject to resolution enhancement from among a plurality of aggregate data in which at least one of a type of value, the D-dimensional space, or partition granularity differs and receive a designation of a target partition indicating to subdivide a space at a higher resolution granularity than that of the subject aggregate data; and employ the plurality of aggregate data to output high resolution data in which the resolution of the subject aggregate data is enhanced, and to output a visualization of the plurality of aggregate data and of a correlation between the plurality of aggregate data obtained through processing to enhance the resolution of the subject aggregate data.

Supplement 8

A non-transitory storage medium stored with a computer-executable program for executing aggregate data resolution enhancement processing, the aggregate data resolution enhancement processing comprising:

for aggregate data of values associated with respective spatial partitions obtained by subdividing a D-dimensional space, receiving a selection of aggregate data subject to resolution enhancement from among a plurality of aggregate data in which at least one of a type of value, the D-dimensional space, or partition granularity differs and receiving a designation of a target partition indicating to subdivide a space at a higher resolution granularity than that of the subject aggregate data; and employing the plurality of aggregate data to output high resolution data in which the resolution of the subject aggregate data is enhanced, and to output a visualization of the plurality of aggregate data and of a correlation between the plurality of aggregate data obtained through processing to enhance the resolution of the subject aggregate data.

Supplement 9

An aggregate data resolution enhancement device comprising:

memory; and at least one processor coupled to the memory, the processor being configured to:

for aggregate data of values associated with respective spatial partitions obtained by subdividing a D-dimensional space, receive aggregate data subject to resolution enhancement and receive a designation of a target partition indicating to subdivide a space at a higher resolution granularity than that of the subject aggregate data; and employ a plurality of aggregate data including the subject aggregate data and in which at least one of a type of value, the D-dimensional space, or partition granularity differs, in order to output high resolution data in which the resolution of the subject aggregate data is enhanced and to output a visualization of the plurality of aggregate data and of a correlation between the plurality of aggregate data obtained through processing to enhance the resolution of the subject aggregate data Supplement 10

A non-transitory storage medium stored with a computer-executable program for executing aggregate data resolution enhancement processing, the aggregate data resolution enhancement processing comprising:

for aggregate data of values associated with respective spatial partitions obtained by subdividing a D-dimensional space, receiving aggregate data subject to resolution enhancement and receiving a designation of a target partition indicating to subdivide a space at a higher resolution granularity than that of the subject aggregate data; and employing a plurality of aggregate data including the subject aggregate data and in which at least one of a type of value, the D-dimensional space, or partition granularity differs, in order to output high resolution data in which the resolution of the subject aggregate data is enhanced and to output a visualization of the plurality of aggregate data and of a correlation between the plurality of aggregate data obtained through processing to enhance the resolution of the subject aggregate data.

The disclosure of Japanese Patent Application No. 2019-128429 is incorporated in its entirety by reference herein.

All cited documents, patent applications, and technical standards mentioned in the present specification are incorporated by reference in the present specification to the same extent as if each individual cited document, patent application, or technical standard was specifically and individually indicated to be incorporated by reference.

EXPLANATION OF THE REFERENCE NUMERALS

10 aggregate data resolution enhancement device
11 CPU
12 ROM
13 RAM
14 storage
15 input section
16 display section
17 communication interface
19 bus
101 aggregate data storage section
102 target partition storage section
103 operation section
104 reception section
105 resolution enhancement section
106 parameter estimation section
107 spatial scale parameter storage section
108 mixing coefficient storage section
109 residual variance parameter storage section
110 noise variance parameter storage section
111 high resolution data computation section
112 output section

The invention claimed is:

1. An aggregate data resolution enhancement device comprising:

a memory; and at least one processor coupled to the memory, the processor being configured to:

perform estimation, for aggregate data in which values are associated with respective regions obtained by subdividing a space and for a Gaussian process model that expresses a plurality of aggregate data in which at least one of a type of value, the space, or a granularity of partition differs, the estimation being performed based on the Gaussian process model including a spatial scale parameter of a correlation function between regions of the aggregate data and including a noise variance parameter of the correlation function, by estimating the spatial scale parameter and the noise variance parameter so as to maximize a function expressing values of the aggregate data by area integrals of a Gaussian process;

receive aggregate data subject to resolution enhancement and a designation of a target partition indicating to subdivide space at a higher resolution granularity than that of the subject aggregate data;

perform computation in the Gaussian process model including the estimated spatial scale parameter and the estimated noise variance parameter, wherein the Gaussian process model includes the spatial scale parameter, the noise variance parameter, mixing coefficients of the Gaussian process and the aggregate data, and a residual variance parameter for the Gaussian process, by computing high resolution data in which the resolution of the subject aggregate data is enhanced by taking area integrals of the values of the subject aggregate data, by computation for each region obtained by subdividing the space at the granularity indicated by the target partition;

model multiple aggregate data simultaneously using the Gaussian process model with a common spatial scale parameter between the aggregated data, and estimate the spatial scale parameter, and predict high-resolution data using the Gaussian process model with the learned spatial scale parameter;

train, using the learned spatial scale parameter and mixing coefficients, the Gaussian process model to enhance resolution of aggregate data.

2. The aggregate data resolution enhancement device of claim 1, wherein:

the Gaussian process model includes the spatial scale parameter, the noise variance parameter, mixing coefficients of the Gaussian process and the aggregate data, and a residual variance parameter for the Gaussian process;

the processor estimates the spatial scale parameter, the noise variance parameter, the mixing coefficients, and the residual variance parameter so as to maximize a function expressing values of the aggregate data by area integrals of a Gaussian process; and the processor performs computation, in the Gaussian process model including the estimated spatial scale parameter, the estimated noise variance parameter, the estimated mixing coefficients, and the estimated residual variance parameter, by computing high resolution data in which the resolution of the subject aggregate data is enhanced by taking area integrals of the values of the subject aggregate data, by computation for each region obtained by subdividing the space at the granularity indicated by the target partition.

3. An aggregate data resolution enhancement device comprising:

a memory; and at least one processor coupled to the memory, the processor being configured to:

perform optimization, for aggregate data in which values are associated with respective spatial partitions obtained by subdividing a D-dimensional space and for a Gaussian process model that expresses a plurality of aggregate data in which at least one of a type of value, the D-dimensional space, or a granularity of partition differs with other aggregate data, the Gaussian process model also including a scale parameter of a correlation function between spatial partitions of the aggregate data and a noise variance parameter of the correlation function, by employing an objective function expressing values of the aggregate data by area integrals of a Gaussian process to optimize the scale parameter and the noise variance parameter;

receive a selection of aggregate data subject to resolution enhancement from out of the plurality of aggregate data and receive a designation of a target partition indicating to subdivide the D-dimensional space at a higher resolution granularity than that of the subject aggregate data;

compute high resolution data in which the resolution of the subject aggregate data is enhanced by taking area integrals in the optimized Gaussian process model, by computation for each spatial partition obtained by subdividing the D-dimensional space at the granularity indicated by the target partition, wherein the Gaussian process model includes the spatial scale parameter, the noise variance parameter, mixing coefficients of the Gaussian process and the aggregate data, and a residual variance parameter for the Gaussian process;

model multiple aggregate data simultaneously using the Gaussian process model with a common spatial scale parameter between the aggregated data, and estimate the spatial scale parameter, and predict high-resolution data using the Gaussian process model with the learned spatial scale; and train, using the learned spatial scale parameter and mixing coefficients, the Gaussian process model to enhance resolution of aggregate data.

4. An aggregate data resolution enhancement device comprising:

a memory; and at least one processor coupled to the memory, the processor being configured to:

for aggregate data of values associated with respective spatial partitions obtained by subdividing a D-dimensional space, receive aggregate data subject to resolution enhancement and receive a designation of a target partition indicating to subdivide the D-dimensional space at a higher resolution granularity than that of the subject aggregate data;

for a Gaussian process model including the aggregate data subject to the resolution enhancement and expressing a plurality of aggregate data in which at least one of a type of value, the D-dimensional space, or a granularity of partition differs with other aggregate data, the Gaussian process model also including a scale parameter of a correlation function between partial regions of the aggregate data and a noise variance parameter of the correlation function, optimize the scale parameter and the noise variance parameter by employing an objective function expressing values of the aggregate data by area integrals of a Gaussian process;

compute high resolution data in which the resolution of the subject aggregate data is enhanced by taking area integrals in the optimized Gaussian process model, by computation for each spatial partition obtained by subdividing the D-dimensional space at the granularity indicated by the target partition, wherein the Gaussian process model includes the spatial scale parameter, the noise variance parameter, mixing coefficients of the Gaussian process and the aggregate data, and a residual variance parameter for the Gaussian process;

model multiple aggregate data simultaneously using the Gaussian process model with a common spatial scale parameter between the aggregated data, and estimate the spatial scale parameter, and predict high-resolution data using the Gaussian process model with the learned spatial scale parameter; and train, using the learned spatial scale parameter and mixing coefficients, the Gaussian process model to enhance resolution of aggregate data.

* * * * *